United States Patent Office 3,424,018
Patented Jan. 28, 1969

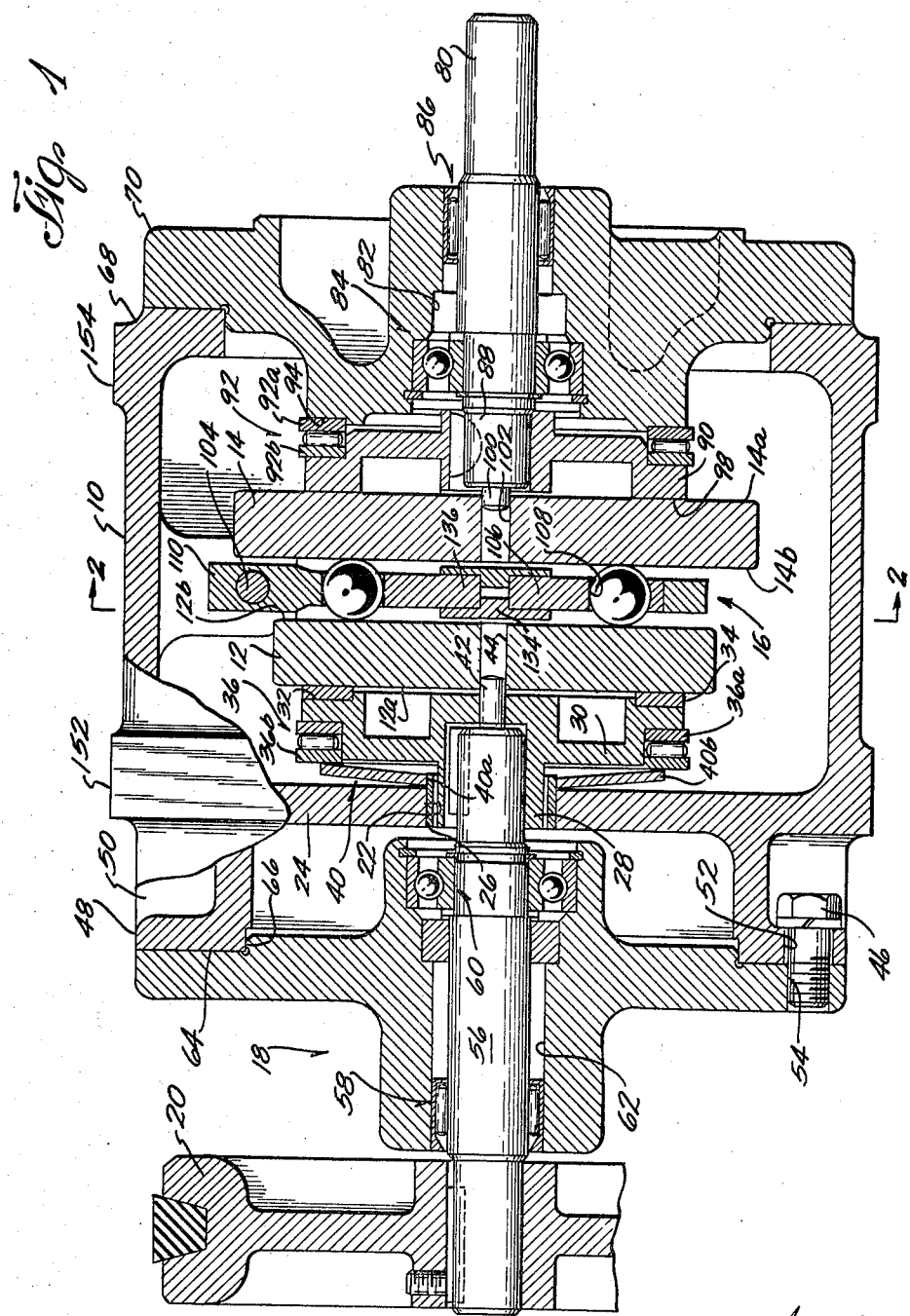

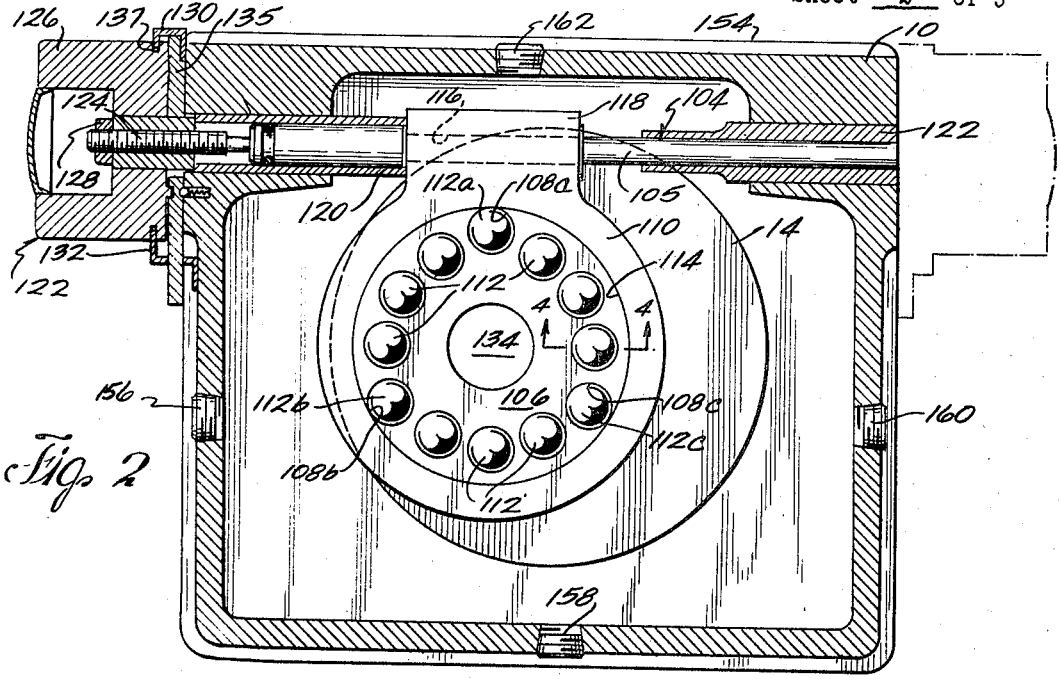
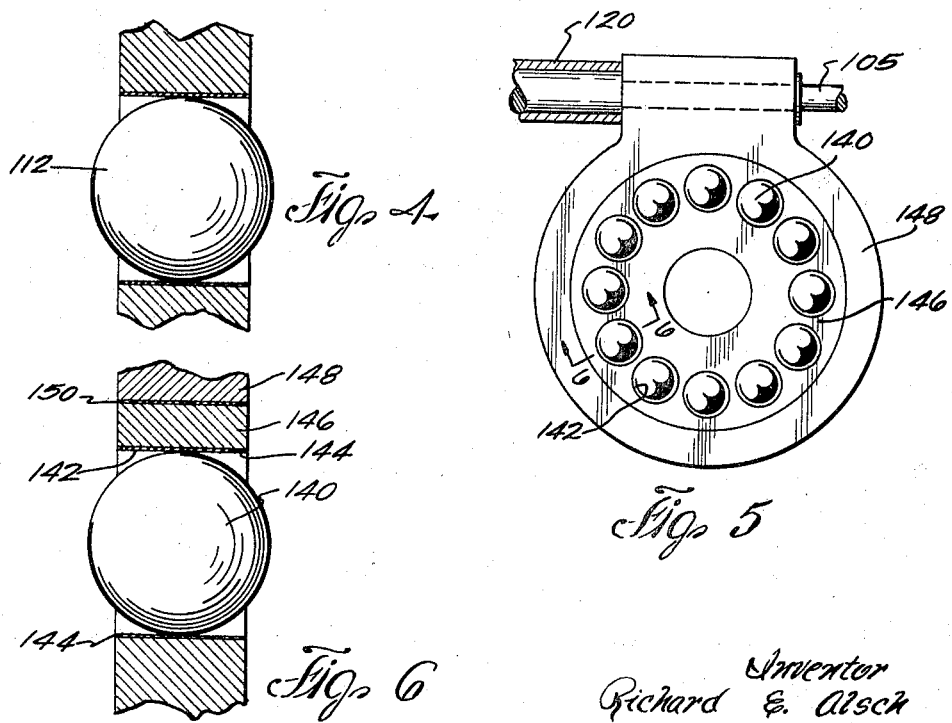

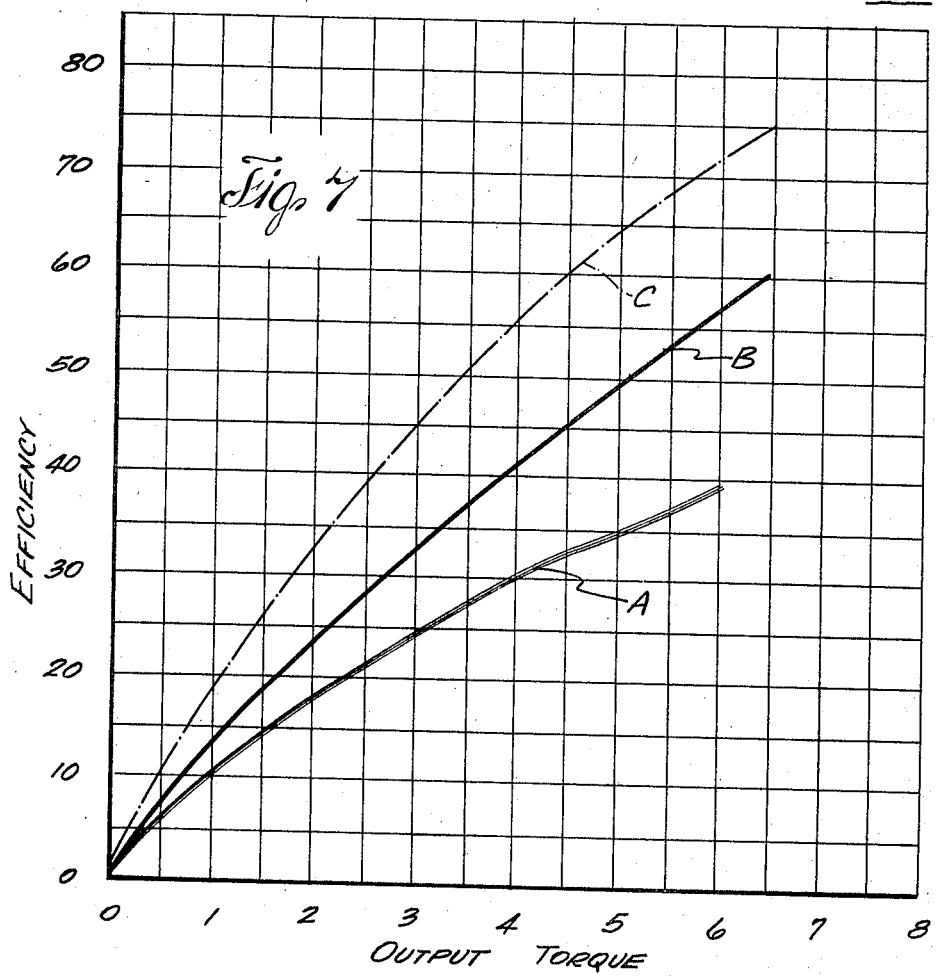
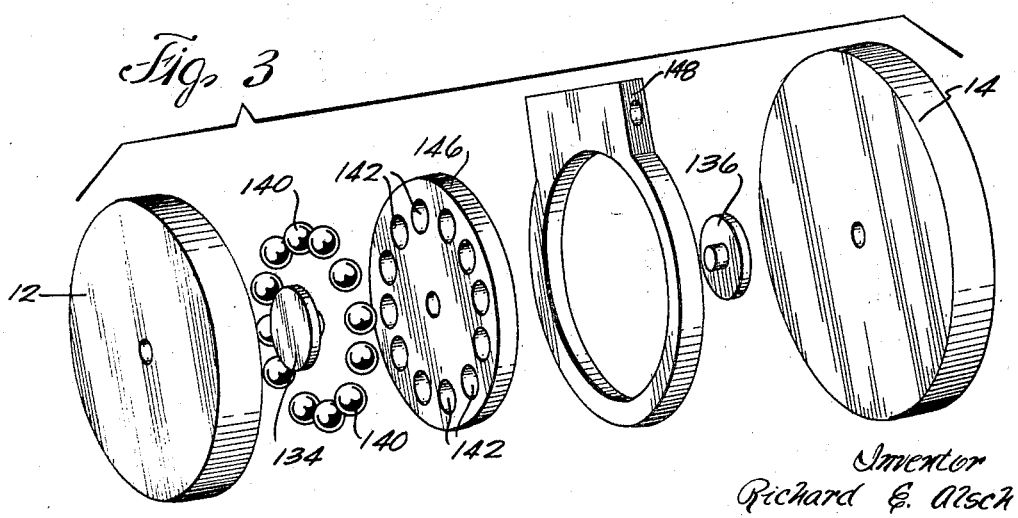

3,424,018
VARIABLE TRANSMISSION
Richard E. Alsch, Lannon, Wis., assignor to Graham Transmissions, Inc., Menomonee Falls, Wis., a corporation of Delaware
Filed Aug. 17, 1966, Ser. No. 573,011
U.S. Cl. 74—198
Int. Cl. F16h 15/26
24 Claims

ABSTRACT OF THE DISCLOSURE

A variable transmission is disclosed having symmetrical discs each with oppositely facing planar faces and held in engagement with transmission balls by face-to-face engagement with input and output members. A holding force is exerted on the drive elements in a pure axial sense and axial thrust bearings provide the medium through which that force is applied with the biasing spring directly engaging the thrust bearing. Friction material provides the drive connection to the input disc and the drive member for the input disc extends through a clearance opening in the housing for connection to an external drive. The ball assembly is supported for pivotal movement about a horizontal axis and the balls provide both the medium of transmission between the discs and the bearing between the cage and its saddle. The bearing surfaces of the ball assembly are coated with a material having a low coefficient of friction.

---

This invention relates to variable speed transmissions and, more particularly, to improvements in variable speed transmissions of the type disclosed in W. S. Rouverol Patent No. 2,951,384.

The type of transmission disclosed in the above mentioned patent utilizes a ball galaxy to transmit rotary motion between an input and an output disc. The discs are arranged on offset axes and the ball galaxy is supported for movement along the confronting faces of the discs. Rotation of the output disc is determined by the position of the ball galaxy between the two discs. This arrangement provides an effective variable transmission but its incorporation into a commercial unit has presented a number of problems which, it has been discovered, have resulted in increasing the cost of the commercial unit, rendering the unit unduly complex and reducing the efficiency of the units.

A general object of this invention is to improve operation, increase efficiency, simplify construction and/or generally reduce the overall cost of such variable transmission units.

A further, more specific, object of this invention is to simplify manufacturing and assembly techniques for such units.

Another object of this invention is to facilitate in-field inspection and repair of such units.

Another object is to permit correction for a scored, or otherwise defective, disc without disturbing the desired adjustment of the other transmission elements.

Another object is to improve the support arrangement for the ball galaxy of such transmission units.

Another object is to provide a variable transmission which permits operation in any one of a number of positions.

Yet another, more specific, object of this invention is to provide a variable transmission which can be connected to and used with standard input and output assemblies, e.g. standard motorized or non-motorized inputs and speed reducers.

Other objects and advantages will be pointed out in, or be apparent from, the specification and claims, as will obvious modifications of the embodiments shown in the drawings, in which:

FIG. 1 is the axial section through a variable transmission unit and illustrating use with a non-motorized input;

FIG. 2 is a section view taken generally along line 2—2 of FIG. 1;

FIG. 3 is an exploded perspective view of the input and output discs and the ball galaxy;

FIG. 4 is an enlarged section view taken generally along line 4—4 of FIG. 2;

FIG. 5 is a partial view of an alternative embodiment;

FIG. 6 is another enlarged section view taken generally along line 5—5 of FIG. 2; and FIG. 7 is a graph plotting output torque against efficiency and comparing transmission performances.

With particular reference to the drawings, the variable speed transmission includes outer housing 10 and input and output discs 12 and 14 arranged within the housing. Ball galaxy 16 is also disposed within the housing and is frictionally held between the input and output discs. Input disc 12 is driven from a suitable input power source. As illustrated in the drawings, a non-motorized adapter 18 is connected to the transmission and carries pulley wheel 20 so that the transmission is powered from a belt drive. Input adapter 18 is mounted at one axial end of housing 10 and is connected to the interior transmission through an opening 22 in housing end wall 24. The actual connection of the adapter to the housing and the drive connection between adapter 18 and disc 12 will be described more completely hereinafter.

Rotation of disc 12 is transmitted through the ball galaxy to output disc 14 in a conventional manner described more specifically in the above noted Rouverol patent. In very general terms discs 12 and 14 are supported for rotation about offset axes and the transmission of rotation between the discs is determined by the relative position of the ball galaxy with respect to the confronting faces of the discs. Movement of the ball galaxy across the confronting faces of the discs permits adjustment in the torque transmission between the input and output discs.

With reference to end wall 24, cylindrical bushing 26 is pressed into opening 22 and, in the final assembly, a generally cylindrical extension 28 of input driving member 30 is positioned within bushing 22. Driving member 30, at its other axial end, includes a circumferential groove 32 which carries an annular member 34 made of any suitable friction material such as conventional brake or clutch disc material. Member 34 projects beyond the inner face of driving member 30 to engage surface 12a of disc 12. Friction member 34 provides the driving connection between driving member 30 and input disc 12. Structurally the input disc has oppositely facing, parallel surfaces 12a and 12b so that both friction member 34 and the ball galaxy engage a planar face.

With the just described arrangement of driving member 30 and input disc 12, the driving connection to the input disc is made through virtual face-to-face engagement and that connection. This provides a more efficient arrangement for transmitting driving force and also permits the use of relatively inexpensive needle-type bearing 36 as the rotational support for driving member 30. In addition the needle bearing provides an axial thrust-type bearing through which the biasing force necessary to maintain sufficient driving engagement between the input and output discs and the ball galaxy can be applied. This further contributes to eliminating radial thrust at the input disc and in the input drive. Structurally, needle bearing 36 extends circumferentially around and is engaged in a circumferential shoulder 38 in driving member 30. Inner race 36a has a pressed fit with the driving member and outer race 36b has a running fit with the driving member. The biasing force for urging the input and output discs and the driving balls into engagement is supplied by a washer-type spring 40, preferably a conventional Belleville spring. Spring 40 is in the shape of a truncated cone and is in engagement with and reacts against bushing 26 and the inner face of end wall 24 to provide the biasing force. The outer end 40b of the spring engages outer race 36b. With this arrangement spring 40 furnishes the biasing force urging the driving member 30, the discs and balls of the galaxy into engagement, the spring also reacting against a fixed assembly disposed at the right end of the unit, as viewed in the drawings, and to be described more completely hereinafter. The biasing force is virtually in a pure axial sense, without radial components and is transmitted through the bearing arrangement without detrimental bearing loading to thereby reduce bearing losses due to improper bearing loads. As a result the force of spring 40 can be selected such that the biasing force urging the transmission members into engagement is far in excess of what is normally required to operate the transmission without slippage. The significance of this feature will be explained hereinafter in connection with the description of the output end of the transmission. As stated above, the efficiency of transmission is further enhanced by transmitting input motion to the input disc in a manner which eliminates improper bearing loads and attendant bearing losses, a condition which would ordinarily reduce the efficiency of transmission.

It will also be noted with this structural arrangement, namely elimination of virtually all radial load on the bearings and input disc 12, the only support necessary for the input disc is the frictional engagement it has with driving member 30 (specifically, friction material 34) and the balls of galaxy 16. This significantly simplifies the construction of the transmission. The only other connection made to the disc is through pin 42 which extends from driving member 30 into central opening 44 in the output disc. This pin is provided merely to facilitate alignment during assembly, after assembly it can be disregarded and eliminated if desired.

Although the transmission is illustrated as attached to a non-motorized input, the transmission can also be used with a motorized input. Preferably its input end is designed in accordance with NEMA standards to receive either a standard non-motorized input adapter as illustrated or standard motors which can be fastened directly to the transmission housing. The actual attachment of adapter 18 to the housing is made through bolts 46 which extend through radial flange 48 provided at the input end of the housing. Radial flange 48 is spaced axially from end wall 24 to provide a circumferential groove 50 to facilitate insertion of bolt 46. The bolts extend through clearance openings 52 in the flange and into threaded openings 54 in the adapter. With this arrangement attachment of the input, whether it be a motorized or non-motorized input, is made from a readily accessible point exterior of the transmission housing.

Generally the input, whether a motorized input or non-motorized input, will include a bearing-supported shaft. As illustrated, adapter 18 includes input shaft 56 which is supported by standard bearings 58 and 60 seated in bore 62 of the adapter. Shaft 56 extends into driving member projection 28 and has a suitable connection to the driving member, for example a key and keyway arrangement, to impart rotary motion to driving member 30. Preferably bushing 26 does not provide a bearing support for projection 28, and correspondingly driving member 30, so that shaft 56 is carried in a two-bearing support. To achieve this a predetermined minimum clearance sufficient to permit extension 28 to rotate freely in bushing 26 is provided between the driving member extension and bushing. The advantage of this arrangement is two-fold, first it permits some limited relative movement between driving member 30, input disc 12 and the ball galaxy. For example, these members can become displaced during a shipment without damage to the transmission and will re-orient themselves when attached to the input source. Secondly and as alluded to briefly above, this arrangement permits attachment of an input having its own bearing support without bearing alignment problems. The input shaft is supported on its own bearings and there is no problem of precise alignment with a bearing surface at the opening 22 thereby minimizing the susceptibility to bearing failure. It has been discovered that a clearance of .004–.005 inch on a side between driving member extension 28 and bushing 26 provides adequate clearance to achieve the desired characteristics. Moreover, during operation the interior of the housing is filled with oil and with this clearance a centrifugal seal occurs at opening 22 and prevents oil leakage.

As stated above the input receiving end of the transmission housing is designed in accordance with standard NEMA specifications and surfaces 64 and 66 are accurately located with respect to opening 22. Specifically surface 66 is concentric with opening 22 and locates adapter 18 such that when input shaft 56 is engaged with driving member 30 it will automatically position the driving member in the desired orientation within housing 10 and with respect to disc 12. These surfaces will locate either the standard non-motorized or motorized inputs.

Turning now to the output end 68 of the transmission, that end is closed by adapter 70 which is also designed to standard NEMA specifications so that the transmission can be readily connected to a standard output member such as a speed reducer. Output shaft 80 is supported in bore 82 in the adapter by a pair of standard bearings 84 and 86. Inner end 88 of the output shaft is keyed to an output or driven member 90 so that rotational movement of member 90 is imparted to output shaft 80. The support for output member 90 is provided by bearing 92. As a result of the already described improved arrangement at the input end, a simplified and improved support and driving connection can be used at the output disc. This support arrangement at the output end preserves the simplicity and effectiveness achieved by the input arrangement. More specifically, the inner axial end of adapter 70 is provided with a shoulder 94. Bearing 92 is a suitable axial thrust bearing such as a needle-type bearing and has outer race 92a pressed into shoulder 94 and inner race 92b pressed into shoulder 96 provided in output member 90. Disc 14, like disc 12, also includes oppositely facing, parallel surfaces 14a and 14b. The inner axial end of output member 90 is provided with surface 98 which is parallel to and directly engages planar surface 14a of output disc 14. As mentioned above in connection with the input end of the transmission, the subassembly formed by output member 90, needle bearing 92 and adapter 70 provide a fixed point against which spring 40 reacts to provide the biasing force holding the transmission elements in assembled relationship. Driving engagement between output disc 14, the balls of galaxy 16 and output member 90 is basically the same as that provided between input member 30 and input disc 12, i.e. with face-to-face engagement and motion being imparted from disc 14 to output member 90 virtually without radial thrust. In this respect, friction material 34 being somewhat resilient, its use offers the added advantage of permitting relative alignment of the transmission elements from inner bearing race 36a through to shoulder 94. This freedom for alignment also cooperates in permitting use of the face-to-face engagement between output member 90 and output disc 14. With this arrangement the output disc is supported solely by frictional engagement between the galaxy balls and surface 98 of output member 90 and without any additional support. Axial thrust-type bearings are again used to contribute to the increase in efficiency, decrease in cost and simplification of the transmission unit. Output shaft 80 also includes pin projection 100 extending into central opening 102 in disc 14 for initial alignment of disc 14 during assembly.

Turning now to ball galaxy 16, discs 12 and 14 are arranged on parallel, but horizontally offset axes and ball galaxy 16 is supported on a lead screw assembly 104 for horizontal movement between the confronting faces of discs 12 and 14. The ball galaxy includes inner steel cage 106 provided with a plurality of ball receiving openings 108. Cage 106 is generally circular and is supported in an outer saddle 110. Balls 112 are engaged in openings 108 and the diameter of the balls is greater than the axial width of cage 106. In this manner balls 112 are frictionally engaged between confronting faces 12b and 14b of the input and output discs.

In operation, balls 112 rotate within their respective openings 108 and the entire cage and ball assembly rotates within saddle 110. Suitable bearing arrangements are provided to accommodate the relative rotation between the cage and the saddle. In the preferred embodiment this bearing is also provided by balls 112. More specifically and with reference to FIG. 2, nine of the balls 112 are supported within totally enclosed through openings 108. However, three equiangularly spaced balls 112, 112b and 112c are supported in openings 108a, and 108b and 108c which open through the circumferential surface of cage 106. Balls 112a, 112b and 112c project through the cage circumference and engage the inner surface 114 of saddle 110 and thereby provide the bearing support upon which the cage and balls rotate with respect to the saddle. Accordingly, every fourth ball in the ball galaxy provides a dual function in that it cooperates in transmitting rotation between the input and output discs and also provides the bearing support for the cage and ball assembly in the saddle. Other forms of bearings can be utilized, for example, a conventional ball bearing support for the cage or the arrangement illustrated in FIGS. 5 and 6, which will be described more completely hereinafter.

With particular reference to FIG. 2, lead screw assembly 104 includes a shaft 105 engaged in an opening 116 provided in hub 118 of the saddle, the shaft and hub being connected for joint movement. Shaft 105 is supported in bushings 120 and 121 pressed into suitable openings through opposed side walls of housing 10. An external adjusting mechanism 122 is connected to shaft 105 and is effective to turn the lead screw assembly to move ball galaxy assembly 16 horizontally with respect to the input and output discs. More specifically, lead screw assembly 104 includes a threaded portion 124 extending from shaft 105 into knob 126. Projection 124 has a threaded engagement with nut assembly 128 which is fixed to knob 126. Brackets 130 and 132 are supported on washer 135 wedged between knob 126 and the transmission housing. Brackets 130 and 132 are engaged in a circumferential groove 137 in the knob so that the knob is held against axial movement and rotation of the knob results in movement of threaded projection 124 axially within the knob and correspondingly produces horizontal movement of shaft 105 and ball galaxy assembly 16. It will be noted that the lead screw assembly is accessible from either of the two opposite sides of the housing so that the adjusting mechanism 122 can be located at either of those two sides, the phantom line showing illustrates the adjusting mechanism on the opposite side wall.

With this construction and arrangement of the transmission elements an overall simplification in the internal transmission unit is achieved and, moreover, assembly and repair of the unit is also facilitated. It will be noted that all of the internal transmission elements can be assembled into the housing through output end 68 and should an internal failure occur in the field necessitating inspection and/or repair all of the internal elements of the transmission are readily accessible. The horizontal support of the ball galaxy on the lead screw assemply provides a pivotal support for the galaxy about which it can be pivoted away from output disc 12 to permit ready access to elements in the housing beyond the ball galaxy without requiring removal of the ball galaxy and its adjusting mechanism. In other words, by pivotally supporting the ball galaxy on an axis which extends transversely of the rotational axes of the output and input discs ready access can be had to the entire interior structure of the transmission.

A further advantage of pivotally supporting the saddle and cage on lead screw assembly 104 is that it permits some relative angular movement of the galaxy cage relative to the input and output discs so that the relative positioning of the lead screw assembly 104, specifically shaft 105, with respect to discs 12 and 14 is less critical. Since this relative movement is possible a pair of buttons 134 and 136 are provided on the opposite faces of cage 106. These buttons prevent direct engagement between the cage and the discs and are made of a material having a low coefficient friction so that should they engage either disc a minimum drag on the discs results. The axial distance between buttons 134 and 136 is less than the diameter of balls 112. For example, a difference of .004 of an inch, or .002 on a side, has given satisfactory results.

At this point a further, significant feature of the preferred construction of this transmission should also be noted. As was stated above, discs 12 and 14 are circular members having oppositely facing planar surfaces 12a–12b and 14a–14b. These surfaces are parallel and the discs are symmetrical so that both disc surfaces can be laped, or otherwise suitably precision ground, to provide the flat surfaces required for effective transmission through balls 112. Thus, in addition to cooperating in permitting the face-to-face engagement of the discs with their respective input and output members so as to contribute to the arrangement which provides a driving force with virtually no radial thrust, this specific configuration of the input and output discs permits either side of the discs to engage the transmission balls. Should either of the confronting disc surfaces become scored, or otherwise damaged, the transmission need only be disassembled as discussed above and the damaged disc reversed to position the opposite surface for engagement with the ball galaxy. Repair is then achieved utilizing the same basic internal elements of the transmission and this maintains the internal dimensions and spacing between the driving elements as they were preset at the factory. This maintaining of the preset dimensions is significant in that it maintains the same orientation with respect to spring 40. The biasing force produced by the spring is dependent upon the distortion of that spring which occurs as a result of the assembly of the other transmission elements, this being particularly true of Belleville springs which are extremely sensitive to changes in dimension. Since the internal spacing between elements will be the same regardless of which of the input or output disc faces are engaged with balls 112 the preset factory dimensions and compression of spring 40 is maintained even if the discs have to be reversed and there is no need to recalibrate the transmission in the event of correction for a scored disc.

It has been discovered that among the factors contributing to the decrease in efficiency of transmissions of this type are losses which occur within the ball galaxy. It was found that the walls of the ball openings in the cage offered significant resistance to ball rotation. It was discovered that the efficiency of transmission can be greatly improved by providing a coating of low coefficient friction material on the inner faces of the ball receiving openings 108. This coating can be any suitable low friction material which lends itself to effective coating techniques, for example Teflon or Nylatron. This same material can also be used for buttons 134 and 136. The coated low coefficient material is provided at the bearing points between the balls and their respective openings and reduces the resistance to ball movement in the openings. It was also discovered that coating the low coefficient material in the opening provided significantly better operating characteristics than, for example, fabricating the entire cage 106 of the material and machining ball openings. The material can be precisely coated on the opening walls and will not require any subsequent machining. Coating, or molding, the material directly onto the walls results in a highly polished surface for the balls to engage and further enhances the low friction engagement between the balls and that material. In contrast, a machining operation on either molded inserts or a cage made of the low friction material destroys the high polished surface left by molding and provides a relatively rougher surface which increases the frictional losses.

In the preferred embodiment where balls 112a, 112b and 112c engage the interior surface of saddle 114, that interior surface could also be provided with a low friction coating in the same manner to thereby further reduce friction losses within the ball galaxy.

In this regard the alternative arrangement illustrated in FIGS. 5 and 6 utilizes balls 140 supported in openings 142 which are coated with low friction material 144. Also the bearing between cage 146 and saddle 148 is provided by coating 150 of low coefficient of friction material between the outer circumference of cage 146 and the interior surface of saddle 148. This arrangement provides increased efficiency as compared to a standard cage and this is illustrated by curve C in FIG. 7.

The curves of FIG. 7 illustrate the improvement achieved by providing the low friction coating in the openings as compared to a standard cage wherein metal-to-metal contact exists between the balls and the opening walls. Curve A shows maximum efficiency for a standard cage to be approximately 35%. The assembly of the alternative of FIGS. 5 and 6 (curve B) increases efficiency to approximately 64%, i.e. approximately a 50% increase in efficiency. The preferred embodiment of FIGS. 1–4 affords still a further increase in efficiency (curve C) to approximately 75%, an increase of 11% over the alternative embodiment.

The direct, face-to-face engagement between the output member 90 and output disc 14 without radial thrust lends itself to providing a simple and effective torque limiting arrangement. As was discussed above the arrangement of the transmission elements permits the biasing force provided by spring 40 to be far in excess of that required to achieve transmission without slippage and the frictional engagement between output member 90 and disc 14 can be so selected that slippage will occur above a predetermined torque value. As an alternative, a suitable insert of friction material could be provided between output member 90 and the output disc which would transmit a predetermined maximum torque and above which slippage would occur. Either alternative will provide an inherent over-torque safety feature.

Housing 10 is provided with peripherally extending spaced rails 152 and 154. These rails form a base support for the transmission housing and by extending the rails completely around the outer periphery of the housing the transmission can be used in any desired orientation. In this respect each of the walls of the housing is provided with a port 156, 158, 160 and 162. These ports provide access to the housing for oil filling so that either one of the ports can be utilized depending on the particular orientation of the housing. In this respect the terms "horizontal" and "vertical" were used in the above description for convenience and are not to be considered as a limitation on the possible orientation of the transmission unit or its elements.

Although this invention has been illustrated and described in connection with particular embodiments thereof, it will be apparent to those skilled in the art that various changes and modifications may be made therein without departing from the spirit of the invention or from the scope of the appended claims.

I claim:

1. A variable transmission comprising, in combination, an input disc having a planar surface,
an output disc adjacent said input disc and having a planar surface in confronting relation with the planar surface of said input disc,
a plurality of balls engaged between said confronting surfaces to transmit motion from said input disc to said output disc,
means providing a force for urging the confronting planar surfaces of said input and output discs into engagement with said balls,
means connecting said force providing means to one of said discs and transmitting said force to said one disc in substantially a pure axial sense with respect to said one disc,
and said one disc characterized by a second planar surface generally parallel to and facing oppositely with respect to the other planar surface thereof, and connecting means engaging said second planar surface and the engagement of said connecting means and said balls with said planar surfaces providing the axial and radial support for said one disc.

2. The variable transmission of claim 1 wherein said force providing means includes spring means,
said connecting means includes axial thrust bearing means,
and said spring means engages and transmits said biasing force through said thrust bearing means.

3. A variable transmission comprising, in combination,
an input disc having a planar surface,
an output disc adjacent said input disc and having a planar surface in confronting relation with the planar surface of said input disc,
a plurality of balls engaged between said confronting surfaces to transmit motion from said input disc to said output disc,
means including spring means providing a force for urging the confronting planar surfaces of said input and output discs into engagement with said balls,
means connecting said force providing means to one of said discs and transmitting said force to said one disc in substantially a pure axial sense with respect to said one disc,
said input disc characterized by a second planar surface generally parallel to and facing oppositely with respect to the other planar surface thereof, said input disc being supported between and by engagement with said connecting means and said balls,
said connecting means including a driving member and axial thrust bearing means, said thrust bearing means engaged between said spring means and said driving member and connecting said spring means and said driving member for relative rotational movement therebetween with said spring means transmitting said biasing force through said thrust bearing means,
and including friction material supported on and rotatable with said driving member, said friction material including a surface disposed generally parallel to the oppositely facing planar surfaces of said input disc and engaging one of said oppositely facing surfaces.

4. The variable transmission of claim 3 including output means,
means supporting said output means for rotation,
said output disc is also characterized by a second planar surface generally parallel to and facing oppositely with respect to the other planar surface thereof,
and said output means including a surface disposed parallel to said planar surfaces of said output disc and engaging one of said output disc planar surfaces to have rotary motion imparted thereto by said output disc.

5. The variable transmission of claim 4 including
a cage supporting said balls,
a saddle supporting said cage,
and a low coefficient of friction material at the points of bearing engagement between said balls and said cage and having the characteristics of a coated surface.

6. The variable transmission of claim 4 including
a housing for said input and output discs and said balls,
input means including said driving member and also including an extension parallel to the axes of rotation of said discs,
means defining an opening in said housing,
and said extension disposed within said opening and adapted for connection to an external power source, said extension having substantial clearance in and freely rotatable with respect to said opening.

7. The variable transmission of claim 6 including spaced rail means on and extending around the exterior of said housing, said rail means providing an attachment base for said transmission in any desired orientation thereof.

8. The variable transmission of claim 5 including lead screw means extending parallel to said planar surfaces and engaging and supporting said saddle for movement of said saddle and said cage parallel to said planar surfaces so that said balls are movable with respect to said planar surfaces to vary motion transmission, said lead screw means also pivotally supporting said saddle and cage on said lead screw means.

9. The variable transmission of claim 8 including means supporting said lead screw means between opposite side walls of said housing and exposing said lead screw means for access through each of said opposite side walls.

10. The variable transmission of claim 6 wherein said opening in said housing is at an axial end of said housing with respect to said discs and balls, and said housing includes means defining adapter receiving surfaces at said one axial end, said adapter receiving surfaces being concentrically related with said opening to locate an input member at said one axial end.

11. The variable transmission of claim 10 wherein said housing includes a radial projecting flange adapted to receive said input member, said flange spaced axially from the axial end wall of said housing and defining therewith an outwardly opening groove through which fastening means can be inserted to attach said input member to said housing.

12. The variable transmission of claim 8 wherein said cage is circular and has an axial dimension less than the diameter of said balls and including projections of low coefficient of friction material on and projecting from the opposite sides of said cage, the axial dimension between the projections being greater than that of said cage and less than said ball diameter.

13. A variable transmission comprising, in combination,
an input disc having a planar surface,
an output disc adjacent said input disc and having a planar surface in confronting relation with the planar surface of said input disc,
a plurality of balls engaged between said confronting surfaces to transmit motion from said input disc to said output disc,
means providing a force for urging the confronting planar surfaces of said input and output discs into engagement with said balls,
means connecting said force providing means to one of said discs and transmitting said force to said one disc in substantially a pure axial sense with respect to said one disc,
said one disc characterized by a second planar surface generally parallel to and facing oppositely with respect to the other planar surface thereof, said one disc being supported between and by engagement with said connecting means and said balls,
a cage supporting said balls,
a saddle supporting said cage for rotation within said saddle,
bearing means between said cage and saddle, and a low coefficient of friction material at the points of bearing engagement between said balls and said cage and having the characteristics of a coated surface.

14. The variable transmission of claim 13 wherein said cage is generally circular,
said saddle surrounds the circumference of said cage, and said bearing means is in the form of a low coefficient of friction material at the point of engagement between said cage and saddle and has the characteristics of a coated surface.

15. The variable transmission of claim 13 wherein said cage is generally circular including a plurality of equiangularly spaced through openings,
said balls disposed in said openings and extending on opposite sides of said cage and engaging said input and output discs,
and a plurality of said openings equiangularly spaced on said cage with respect to each other disposed at and opening through the circumference of said cage with the balls in said equiangularly spaced openings engaging said saddle to provide said bearing means.

16. The variable transmission of claim 15 including low coefficient of friction material at the point of bearing engagement between said balls and said saddle and having the characteristics of a coated surface.

17. A variable transmission comprising, in combination,
a housing having oppositely disposed input and output ends,
input and output discs within said housing, each disc being generally circular and having oppositely facing, generally planar surfaces so that said discs are generally symmetrical,
said input and output discs disposed adjacent each other on parallel axes and in opposed relationship with a pair of planar surfaces in confronting relation,
a plurality of balls between and engaging said confronting surfaces to transmit rotation from said input disc to said output discs,
support means including cage means for said balls and supporting said balls for movement parallel to said confronting faces to vary said transmission,
input means extending exteriorly of said housing and including a driving surface parallel to and engaged with the planar surface of said input disc opposite to that engaged by said balls,
and means urging said driving surface, discs and balls into driving engagement.

18. The variable transmission of claim 17 including output means at said output end of said housing and including an output member having a surface parallel to said planar surfaces and engaging the planar surface of said output disc opposite to that engaged by said balls, the engagement of said balls, said driving surface and said output member surface with said input and output disc surfaces providing the axial and radial support for said discs.

19. The variable transmission of claim 18 including friction material disposed between said driving member and input disc and engaging said input disc to provide the medium through which said driving member imparts driving movement to said input disc.

20. The variable transmission of claim 17 wherein said means urging said driving surface, discs and balls into driving engagement comprises spring means and means defining a first seat for said spring means,
and said input means includes axial thrust bearing means engaged between said driving member and said spring means to transmit biasing force of said spring means to said driving member, discs, balls and output member in an axial sense.

21. The variable transmission of claim 17 including low coefficient of friction material coated onto the points of bearing engagement between said balls, cage means and support means.

22. A drive transmitting unit comprising, in combination,
a housing,
input means,
output means,
means within said housing for transmitting motion from said input means to said output means,
means defining an opening through a housing wall,
external input drive means attached to said housing adjacent said opening,
said input means including a portion arranged for rotation within said opening and adapted to be connected to said external drive means,
said input means portion having clearance with and rotatable freely with respect to said opening, said input member having shaft means and first and second axially spaced bearings for said shaft means,
and said shaft means engaged with said input means portion so that said shaft means has only two bearing supports.

23. A variable transmission comprising, in combination,
an input disc having a planar surface,
an output disc adjacent said input disc and having a planar surface in confronting relation with the planar surface of said input disc,
a plurality of balls engaged between said confronting surfaces to transmit motion from said input disc to said output disc,
means providing a force for urging the confronting planar surfaces of said input and output discs into engagement with said balls,
a generally circular cage,
means defining a plurality of through openings in said cage,
said balls disposed in said openings and extending on opposite sides of said cage and engaging said input and output discs,
a saddle surrounding the circumference of said cage,
and a plurality of said cage openings disposed at and opening through the cage circumference at angularly spaced points with the balls in said angularly spaced openings engaging said saddle and providing bearing means between said cage and said saddle.

24. The combination of claim 22 wherein said drive transmitting unit includes
input and output discs and a ball drive between said input and output discs and transmitting motion between said discs,
means for moving said ball drive relative to said input and output discs to vary the motion transmission therebetween,
and wherein said input means is connected to said input disc and said output means is connected to said output disc.

References Cited

UNITED STATES PATENTS

| | | | |
|---|---|---|---|
| 2,981,119 | 4/1961 | Brown | 74—198 |
| 3,204,476 | 9/1965 | Rouverol | 74—198 |

FRED C. MATTERN, JR., *Primary Examiner.*